United States Patent [19]
Glew et al.

[11] Patent Number: 5,948,097
[45] Date of Patent: *Sep. 7, 1999

[54] METHOD AND APPARATUS FOR CHANGING PRIVILEGE LEVELS IN A COMPUTER SYSTEM WITHOUT USE OF A CALL GATE

[75] Inventors: Andrew Glew, Madison, Wis.; Scott Dion Rodgers, Hillsboro, Oreg.

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/705,156

[22] Filed: Aug. 29, 1996

[51] Int. Cl.$^6$ .............................. G06F 12/00; G06F 12/16
[52] U.S. Cl. ......................... 712/220; 712/225; 712/226; 712/41; 712/42; 712/23
[58] Field of Search ..................................... 395/566, 567, 395/390–395, 500, 800, 561–570, 183, 185, 800.23, 800.41–800.43; 712/225, 226, 229, 23, 41–43

[56] References Cited

U.S. PATENT DOCUMENTS

| | | | |
|---|---|---|---|
| 4,809,160 | 2/1989 | Mahon et al. ............................ | 395/186 |
| 5,043,878 | 8/1991 | Ooi ......................................... | 395/800.42 |
| 5,418,956 | 5/1995 | Willman .................................. | 395/682 |
| 5,493,687 | 2/1996 | Garg et al. .............................. | 395/800.23 |
| 5,524,224 | 6/1996 | Denman et al. ........................ | 395/395 |
| 5,684,948 | 11/1997 | Johnson et al. ......................... | 710/260 |
| 5,685,009 | 11/1997 | Blomgren et al. ................. | 395/800.23 |
| 5,774,686 | 6/1998 | Hammond et al. ..................... | 395/385 |
| 5,781,753 | 7/1998 | McFarland et al. .................... | 395/394 |
| 5,822,578 | 10/1998 | Frank et al. ............................ | 395/591 |

*Primary Examiner*—Zarni Maung
*Assistant Examiner*—Bharat Barot
*Attorney, Agent, or Firm*—Laura L. Mikkola

[57] ABSTRACT

A method and apparatus for performing a system call in a system having a user privilege level and a kernel privilege level, wherein the kernel privilege level is higher than the user privilege level is disclosed. A sequence of instructions is executed at the user privilege level including a first instruction that requires a resource provided at the kernel privilege level. Control is transferred to a first procedure executing at the user privilege level by performing a near call and saving only a pointer to the first instruction. The first procedure includes a calling instruction that does not save an architectural state prior to transferring control. Control is transferred from the first procedure to a second procedure executing at the kernel privilege level. The second procedure determines the resource required by the first instruction. Control is transferred from the second procedure to a third procedure that is determined by the second procedure. The third procedure operates at the kernel privilege level and providing the resource required by the first instruction. Control is returned to the sequence of instructions either by the third procedure or by a fourth procedure that selectively restores previously saved architectural state.

20 Claims, 7 Drawing Sheets

METHOD AND APPARATUS FOR CHANGING PRIVILEGE LEVELS IN A COMPUTER SYSTEM WITHOUT USE OF A CALL GATE

FIELD OF THE INVENTION

The field of the invention relates to computer software instructions. More specifically, the invention relates to a method and apparatus for performing a fast system call.

BACKGROUND OF THE INVENTION

Prior art computer systems, such as computer system 10 of FIG. 1, employ various levels of software. At a high level are application programs and operating systems, available over-the-shelf to consumers. At a lower level are the system (BIOS) and device drivers that are responsible for manipulating basic interactions among hardware components within the computer system.

The different levels of software typically reside on a permanent form of data storage device. For instance, the BIOS is typically burned into one or more ROM devices that are used along with DRAM to implement system memory 130. The application programs and operating systems typically reside on hard drive 151. These permanent forms of data storage are slow to access. When it is necessary for the program to be executed, the program or a portion thereof is loaded into system memory 130 so as to decrease execution times.

The microprocessor 110 is illustrated in FIG. 1 as a multi-chip module (CM) that comprises not only the main processor 111 but also the second level (L2) cache 112, an advanced programmable interrupt controller (APIC) 113, and a bus interface unit 114. One example of an MCM is the Pentium® Pro processor, manufactured by Intel Corporation of Santa Clara, Calif.

The memory controller and bridge chip 120 is responsible for communications between the microprocessor 110, the system memory 130, and the system bus 140. The system memory 130 typically comprises dynamic random access memory (DRAM). The system memory may additionally comprise one or more ROM devices that contain boot-up code.

System bus 140 is a high-speed bus that is coupled to peripheral devices 160, which may include a graphics accelerator, fax modem board, sound card, and other add-in boards. The system bus 140 is also coupled to the hard drive controller 150. The hard drive controller interfaces between the system bus 140 and the hard drive 151. As mentioned previously, both the system memory 130 and the hard drive 151 may include software that is executed by the microprocessor 110.

Prior art microprocessors employ privilege levels that are assigned to each level of software. The segmented addressing scheme common to Intel architecture processors (e.g. the Pentium® Pro processor), facilitates the privilege level scheme. These processors have four levels of privilege. Privilege level 0 is the highest privilege level, and therefore code executing at this privilege level has access to the most features available. Privilege level 3 is the lowest privilege level, and is therefore most restrictive as to which features are available to code executing at this privilege level. Privilege level 0 is typically reserved for the operating system "kernel," that contains the most critical code modules of the operating system. Privilege level 3 is often referred to as the "user level," which is typically the level of execution of the user application programs, such as word processors, spread sheets, and desktop publishers.

A program executing at one privilege level may switch execution to a program executing at another privilege level. This is typically accomplished through a call gate, task gate, or interrupt gate. FIG. 2 illustrates a block diagram of a prior art call from a procedure at a user privilege level to a procedure within an operating system kernel.

For the example shown in FIG. 2, the call from user code 210 to kernel code 240 occurs in two steps. First, the user code 210 at privilege level 3 executes a far call instruction to a software routine that is at privilege level 0. In prior art processors, this far call occurs through a gate 220. The gate is a tightly-controlled interface that protects the kernel code at privilege level 0 from being interfered with by a user at a lower privilege level.

The address associated with the call instruction in user code 210 points to a call gate descriptor 220. The call gate descriptor provides information about the privileged code 230 being called. For instance, the call gate descriptor provides access rights, information about the new code segment, the new privilege level, and information about the new stack segment.

In transferring execution from a privilege level 3 procedure 210 to a privilege level 0 procedure 230, the CALL instruction performs many state-saving operations. Some of the architectural state of the computer (the values of several predetermined registers) is pushed on to the stack before control is transferred to the called procedure 230. Then, when a return instruction (RET) is asserted within the privileged code 230, the contents of the stack are restored to the appropriate registers.

If it is determined that the calling procedure 210 has the appropriate access rights to the called procedure 230, then execution transfers to the privileged code 230. Within the privileged code 230, another call is performed in order to switch to the kernel code 240.

Similarly to the first call instruction in user code 210, the call instruction in privileged code 230 performs many state-saving operations. Once again, some of the architectural state of the computer is saved before execution is transferred from the privileged code 230 to the kernel code 240. A detailed description of the prior art procedure calls described above can be found within the Pentium Pro Family Developer's Manual, vols. 1–3, available from Intel Corporation of Santa Clara, Calif.

The state saving that is associated with the CALL instruction, and similarly with other prior art procedure call instructions, can be disadvantageous. Often the privileged code 230 comprises a library routine that is solely responsible for making a procedure call to the kernel. Therefore, there is no need to save much of the architectural state that is normally saved during a system call from the user code 210 to the privileged code 230. Saving the architectural state during both call instructions is time consuming, thus decreasing the performance of the computer system. For instance, prior art procedure calls have taken anywhere from approximately 300–1000 clock cycles, depending on the particular application.

Moreover, often times operating system code is set up to be a flat operating system, such as UNIX* or Microsoft WindowsNT*. The flat operating system often uses the same attributes in setting up code and data segments. Thus, there is no need to use a segment descriptor to customize code and data segments of the privileged operating system procedure.

* other brands and names are the property of their respective owners

It is therefore desirable to provide for a method of performing a system call wherein a reduced amount of the entire architectural state of the computer is saved. It is further desirable to provide an instruction that is capable of performing a call to a privileged procedure in a reduced number of clock cycles. It is yet further desirable to provide for a method of performing a system call to a more privileged procedure without using a descriptor table. It is also desirable to provide a method for resuming user level code after the called privileged procedure completes.

SUMMARY OF THE INVENTION

A method and apparatus for performing a system call in a system having a user privilege level and a kernel privilege level, wherein the kernel privilege level is higher than the user privilege level is disclosed. A sequence of instructions is executed at the user privilege level including a first instruction that requires a resource provided at the kernel privilege level. Control is transferred to a first procedure executing at the user privilege level by performing a near call and saving only a pointer to the first instruction. The first procedure includes a calling instruction that does not save an architectural state prior to transferring control.

Control is transferred from the first procedure to a second procedure executing at the kernel privilege level. The second procedure determines the resource required by the first instruction. Control is transferred from the second procedure to a third procedure that is determined by the second procedure. The third procedure operates at the kernel privilege level and providing the resource required by the first instruction.

In one embodiment, control is transferred from the third procedure to a fourth procedure, the fourth procedure operates at the kernel privilege level and selectively restores previously saved architectural state, The fourth procedure also returns control to the sequence of instructions. In an alternative embodiment, the third procedure selectively restores previously saved architectural state and returns control to the sequence of instructions.

BRIEF DESCRIPTION OF THE DRAWINGS

The present invention is illustrated by way of example and not limitation in the accompanying figures and in which.

DETAILED DESCRIPTION

A method and apparatus for performing a fast system call is described. In the following description, numerous specific details are set forth, such as specific system components, computer languages, data structures, and code sequences in order to provide a thorough understanding of the present invention. It will be apparent, however, to one skilled in the art that these specific details need not be employed to practice the present invention. In other instances, well known components or methods have not been described in detail in order to avoid obscuring the present invention.

The method of the present invention performs a transfer in execution from a user privilege level procedure to a privileged operating system procedure. The method employs two new instructions to perform the fast system call. The SYSENTER instruction is used to enter the operating system procedure from a calling procedure. The SYSEXIT instruction is used to return from the called operating system procedure to the calling procedure.

For one embodiment, SYSENTER and SYSEXIT are assembly-language instructions that may be executed on an Intel architecture processor, such as the Pentium Pro processor. The instructions may, however, be implemented in a similar low-level language on another well-known processor architecture. While the mnemonics SYSENTER and SYSEXIT are used herein to describe the invention, it should be appreciated that the particular mnemonic assigned to each instruction is not intended to limit the scope of the invention.

Figure 1:
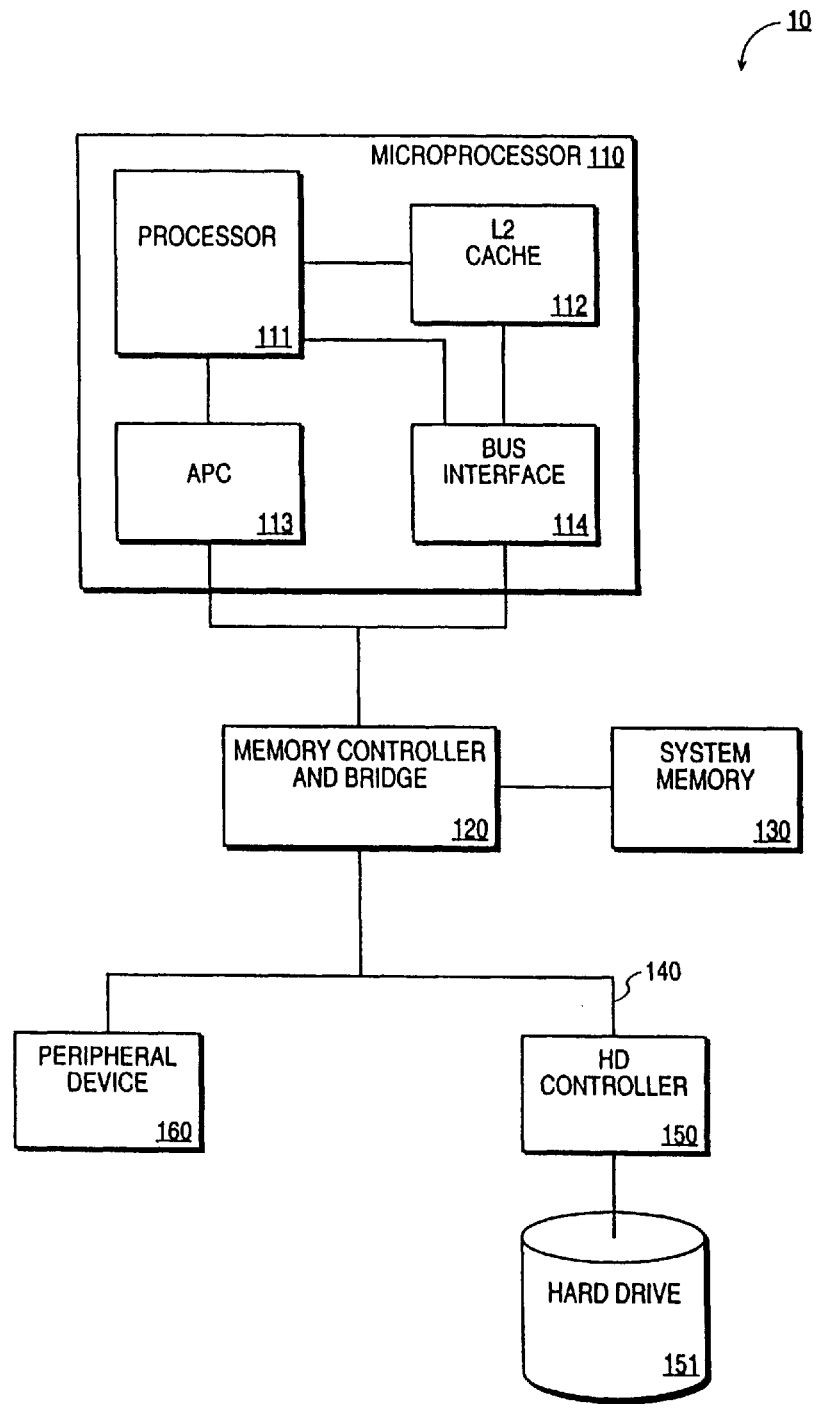
FIG. 1 illustrates a block diagram of a prior art computer system.
Figure 2:
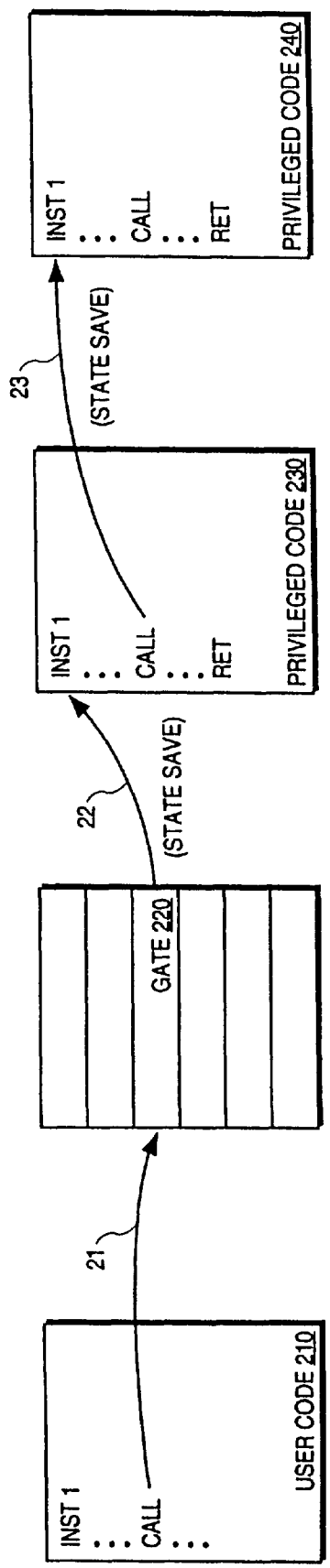
FIG. 2 illustrates a block diagram of a prior art procedure call to a privileged routine.
Figure 3:
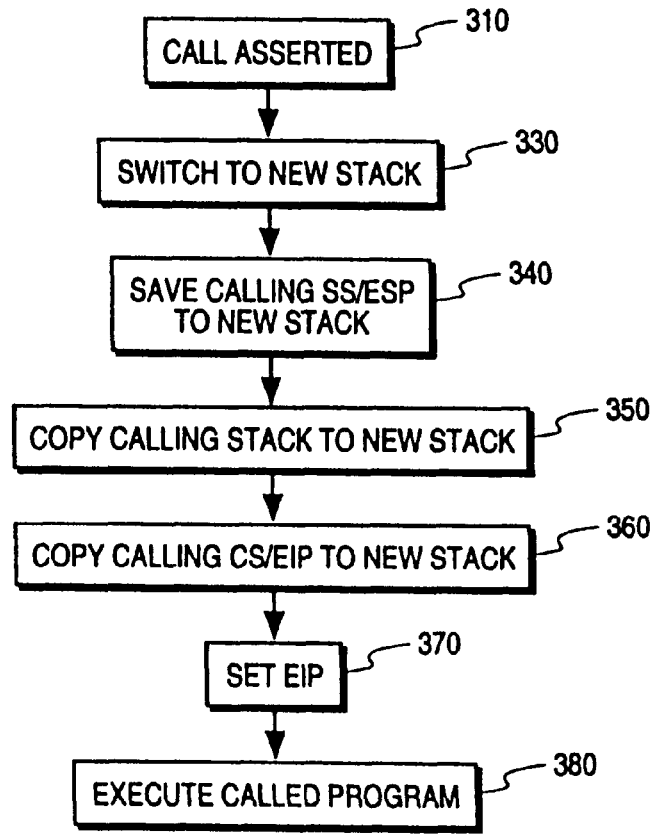
FIG. 3 illustrates a flow diagram of a prior art procedure call instruction to a privileged routine.

FIG. 3 illustrates a flow diagram of a prior art procedure call to a more privileged procedure. Recall that for one embodiment, the higher privilege levels are designated by lower privilege numbers. Alternatively, higher privilege levels may be designated by higher privilege numbers. The CALL instruction is asserted from within the less privileged calling procedure at step 310.

A new stack is used for the called (higher privilege) procedure. This new stack is switched to at step 330. The stack segment (SS) and stack pointer (ESP) values of the calling procedure are then saved on the new stack at step 340. This step is performed so that the SS and ESP values can be restored once execution returns to the calling procedure.

The contents of the calling stack are then copied on to the new stack at step 350. Using this information, the programmer may pass parameters on the stack between the calling procedure and the called procedure.

The code segment (CS) and instruction pointer (EIP) values of the calling procedure are copied to the new stack at step 360. Finally, at step 370, the instruction pointer (EIP) of the called procedure is loaded with the appropriate starting address. The called program can then begin executing at step 380.

As was discussed herein above, some prior art implementations of procedure calls to more privileged procedures may require the use of a call gate. If a call gate is used in performing the procedure call, the call gate descriptor must be found within a descriptor table and loaded from system memory. Thereafter, the call gate descriptor is verified to ensure, e.g., that it is the right type of call gate, that the privilege level of the called routine is correct, and that the user code has the correct privilege level to access the call gate.

In order to load the called procedure into system memory, another descriptor must be found within the descriptor table, loaded into memory, and verified. This descriptor points to the called procedure code.

As can be appreciated from the discussion above, performing a prior art procedure call is a lengthy process, requiring many different memory-loading and state-saving operations. It is therefore undesirable and unnecessary to use this procedure call in all situations wherein execution is being transferred from one procedure to another. Rather, it is desirable to provide for a fast system call for transferring execution from a lower user level code to a higher privilege level code, without requiring excessive state-saving operations and excessive loading and verifying of descriptors.

A method for performing a fast system call within a computer system is described. As mentioned previously, two instructions are used to perform the fast system call to the operating system. The SYSENTER and SYSEXIT instructions are used to enter and exit, respectively, the desired operating system procedure.

Figure 4:
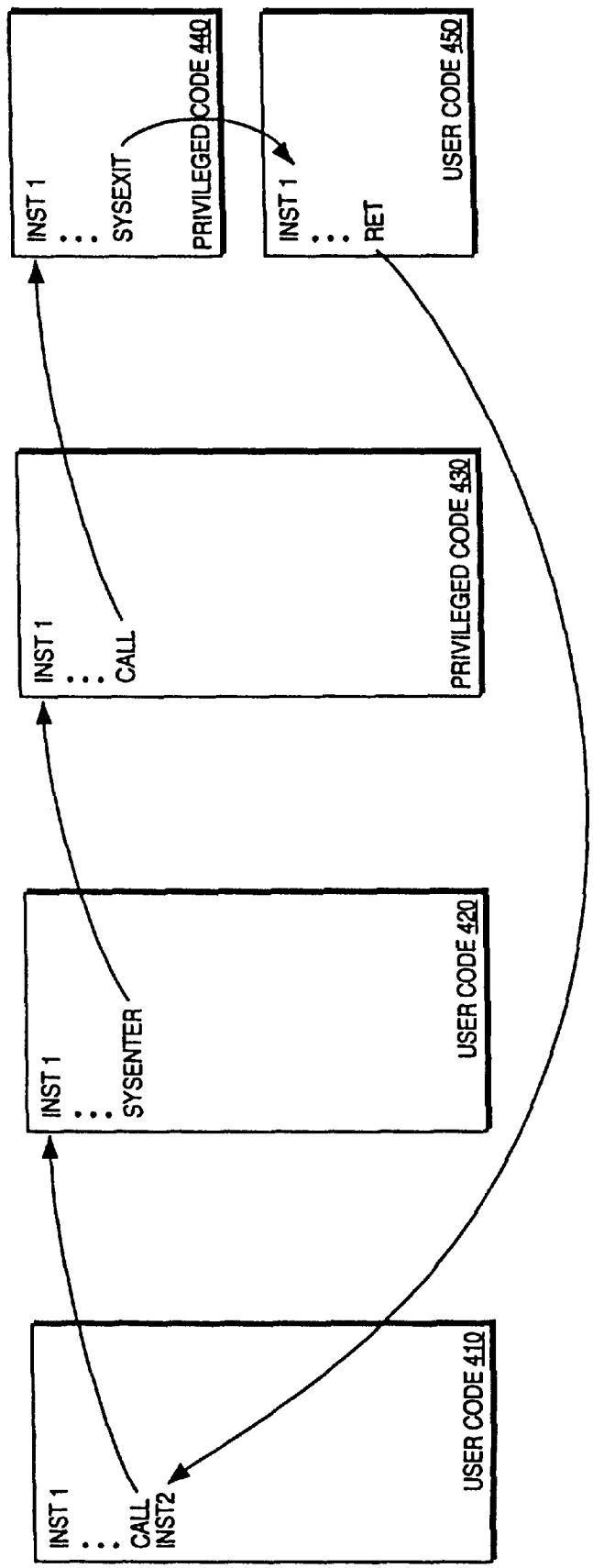
FIG. 4 illustrates a block diagram of a procedure call in accordance with one embodiment of the invention.

FIG. 4 illustrates a high-level block diagram of a method of performing a fast system call from user code 410 to operating system kernel code 430 and a return back to user code 410.

For the embodiment illustrated in FIG. 4, two procedure calls are performed to get to the privileged code 430. First, a procedure 410 that is executing at a low privilege level performs a procedure call to a common procedure 420 at the same privilege level. The SYSENTER instruction is then executed from within the common user procedure 420. The SYSENTER instruction transfers execution to a privileged procedure 430, which in turn calls a privileged routine 440 to handle the request of the less-privileged user code 410.

The user code 410 is a procedure operating at the lowest privilege level, user privilege level 3. The user code 410 performs a near call instruction to the common user code 420. The procedure call only saves a pointer to the calling procedure upon performing the transfer of execution to the common user code 420.

Within the common user code 420, the SYSENTER instruction is asserted. This causes execution to be transferred to the privileged operating system kernel code 430. Unlike the prior art procedure call methods, the SYSENTER instruction does not save the architectural state of the processor before transferring execution to the more privileged kernel code 430. Moreover, the SYSENTER instruction does not require the loading or verifying of a call gate descriptor, as was used in the prior art procedure call method. Instead, if it is desired by the programmer to have the system state saved, the appropriate state-saving instructions are executed from within the common user code procedure 420.

For one embodiment, the user code procedure 420 comprises a library routine. For this embodiment, the user code procedure 420 is called a "system stub" routine. By keeping the SYSENTER instruction within a library routine that is able to be called by user code 410, it provides a single point of access to the kernel code. This offers a level of protection in accessing operating system kernel procedures.

The privileged kernel code 430 may then select from several service routines 440 to handle the user code 410 request. For instance, assume that the user code 410 desires a printing function to be performed by the operating system kernel. Recall that for one embodiment, common user code 420 is a library routine that provides user code 410 with a single point of access to the kernel code 430. Thus, if the user code 410 desires a printing function of the kernel, the user code 410 writes a data value, representing the printing function, in to a memory device (e.g. a register or system memory) before calling the library routine 420. The privileged kernel code 430 then reads the data value and calls an appropriate privileged service routine 440 to handle the printing request.

For one embodiment, kernel code 430 also performs a check to make sure that user code 410 is authorized to request the function. For instance, if the user code 410 requests to access the password file, the kernel code 430 ensures that user code 410 is authorized to do so.

For another embodiment of the invention, the kernel code 430 does not call another service routine 440, but instead handles the user code 410 request itself.

Once the selected service routine 440 has completed, SYSEXIT is used to return to another common user routine 450. For one embodiment, the common user routine 450 is at the user privilege level and is part of a runtime library, similar to user code 420. Thus the library contains a dedicated SYSENTER routine 420 and a dedicated SYSEXIT routine 450. This SYSEXIT user code 450 restores any state saved earlier by the SYSENTER library routine 420 before returning to the original caller, user code 410.

As described in more detail herein below, the SYSEXIT instruction is similar to SYSENTER in that it restores a minimum amount of the architectural state of the computer before transferring control to user code 450. For one embodiment, the user code 450 restores the architectural state of the computer saved by user code 420. The return instruction executed within the user code 450 restores the instruction pointer (EIP) value, transferring control to the next instruction following the CALL instruction of user code 410. Alternatively, when the SYSEXIT command is asserted, control is transferred back to the SYSENTER library routine 420, which then asserts a return instruction to transfer control back to user routine 410.

For another embodiment, the service routine 440, rather than user code 450, performs the state restoration prior to executing SYSEXIT. In this embodiment, the SYSEXIT transfers control directly to the instruction following the CALL in the user code 410.

For yet another embodiment, the kernel code 430 performs the state restoring once control has returned from the service routine 440, and subsequently asserts the SYSEXIT command. Control is then transferred to the user procedure 410.

As can be appreciated from the description herein above, the hierarchy of software procedures 410–450 may be modified from that illustrated in FIG. 4 without departing from the scope of the present invention.

Figure 5:
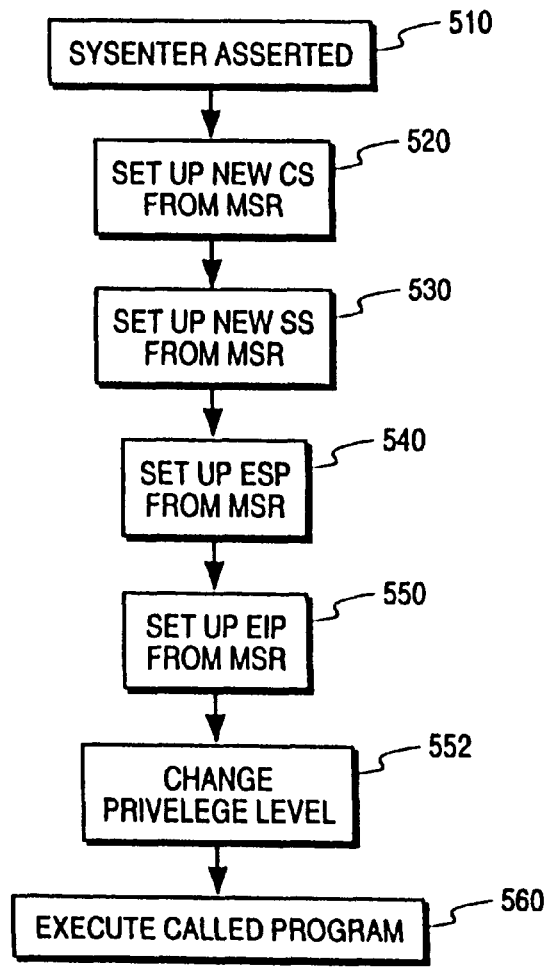
FIG. 5 illustrates a flow diagram of a SYSENTER instruction in accordance with one embodiment of the invention.

FIG. 5 illustrates a flow diagram of the several operations performed when the SYSENTER instruction is executed. The SYSENTER instruction is asserted at step 510 from within the calling procedure. For one embodiment, the calling procedure may be at any privilege level when asserting the SYSENTER instruction. For another embodiment, the SYSENTER instruction is asserted only from within a system stub program at a user privilege level that is one of a library of user routines.

The new code segment for the called procedure within the operating system kernel is then set up at step 520. At some point previous to the assertion of the SYSENTER instruction, the desired code segment value is written into one of the machine status registers (SYSENTER_CS_MSR) that is used by the SYSENTER instruction. Note, however, that write access to the MSRs is protected, such that only the most privileged code (privilege level 0) may write to them. At step 520, the SYSENTER_CS_MSR value is copied into the CS register. While the present invention is described as using particular MSRs in executing SYSENTER and SYSEXIT, it should be appreciated that any constants, registers or memory locations may be used to set up the code and stack segments.

For one embodiment, the operating system determines when the SYSENTER and SYSEXIT instructions may be asserted. Thus, the operating system controls the enablement of the SYSENTER and SYSEXIT MSRs such that the SYSENTER and SYSEXIT instructions may only be asserted when the designated MSRs are enabled.

As was mentioned previously, the operating system kernel that is being called is often a flat operating system. This means that typically the base address for the code segment is set to 0. Moreover, the segment limit is typically set to 4 gigabytes (4 G). Thus, for one embodiment of the invention, the CS base is set to 0 at step 520, and the CS limit is set to 4 G. For another embodiment of the invention, the CS base and limit are set to another constant value by the SYSENTER instruction. For yet a third embodiment of the invention, the values for the CS base and limit are not set equal to a constant at step 520, but instead are copied from a memory location or register that was previously loaded with the appropriate values.

The stack segment for the kernel procedure is established at step 530. For one embodiment, the stack segment selector is set to an offset from the code segment selector. For instance, setting the stack segment selector equal to the code segment selector +8 will point to the next available selector up from the code segment. For an alternative embodiment, the stack segment selector may be copied from a memory location or register that has been previously loaded with an appropriate value. For an embodiment wherein the operating system is a flat operating system, the stack segment base is set to 0 and the limit is set to 4 G at step 530.

The stack pointer (ESP) for the operating system procedure is established at step 540. For one embodiment, the ESP value is loaded from another designated MSR. The SYSENTER_ESP_MSR holds the value of the stack pointer and this value is copied into the ESP register at step 540.

The instruction pointer (EIP) is established at step 550. The value of EIP will point to the instruction in the kernel code at which execution is to begin. For one embodiment, the EIP is copied from the SYSENTER_EIP_MSR in to the EIP register at step 550. After changing the privilege level to the highest privilege level at step 552, the privileged kernel code begins execution at step 560.

The following is pseudo-code for one embodiment of the SYSENTER instruction compatible with the Intel architecture:

IF CR0.PE==0 THEN #GP0 //ensure segment protection enabled
IF SYSENTER_CS_MSR<=3 THEN #GP0 //ensure SYSENTER enabled
ELFAGS.VM:=0 //leave VM86 mode
EFLAGS.IF:=0 //mask interrupts
//CS:EIP and SS:ESP for the calling program are not saved; this must be done by
//user program or calling program in MSR registers
//privilege level is set to 0
CS.SEL:=SYSENTER_CS_MSR //operating system provides CS
//set rest of CS to fixed value
cs.base:=0 //flat segment
cs.limit:=4 G
cs.g:=1 //granularity=4k
cs.s:=1
cs.type_xCRA:=1011 //execute+read, accessed
cs.p:=1
cs.d:=1 //32 bit code
cs.dpl:=0 //privileged descriptor privilege level
cs.rpl 0 //privileged requester privilege level
SS.SEL:=SYSENTER_CS_MSR+8 SS points to next selector up from CS
//set rest of SS to fixed value
ss.base:=0 //flat segment
ss.limit:=4 G
ss.g:=1 //granularity=4k
ss.s:=1
ss.type_xCRA:=0011 //read/write, accessed
ss.p:=1
ss.d:=1 //32 bit code
ss.dpl:=0 //privileged descriptor privilege level
ss.rpl:=0 //privileged requester privilege level
CPL:=0 //change privilege level to most privileged
ESP:=SYSENTER_ESP_MSR
EIP:=SYSENTER_EIP_MSR For the embodiment of the SYSENTER instruction provided above, execution is always transferred to a flat protected mode kernel at privilege level 0 and the SYSENTER instruction can be invoked by a user program executing in any mode. In this embodiment, the cs.rpl and ss.rpl are set up such that a lower privilege level (i.e. privilege levels 1–3) may call the operating system kernel procedure.

It should be appreciated by one skilled in the art that the SYSENTER instruction may be implemented differently from the pseudo-code provided above without departing from the scope of the invention. For instance, the code and stack segments may be set up such that they have different attributes than those provided above. Moreover, the CS:EIP and SS:ESP values need not be specified by the MSR registers. They may be set up by the user code, the system stub, or the operating system through any of the registers or memory storage areas visible to the operating system.

Moreover, an embodiment of the SYSENTER instruction need not implement all of the setup instructions located at the beginning of the pseudo-code. These are meant merely as extra safeguards and are therefore not meant to limit the scope of the present invention.

Note that one of the setup instructions disables VM86 mode by writing to the EFLAGS register. For this embodiment, the SYSENTER instruction always enters the protected mode when transferring execution to the called procedure.

Figure 6:
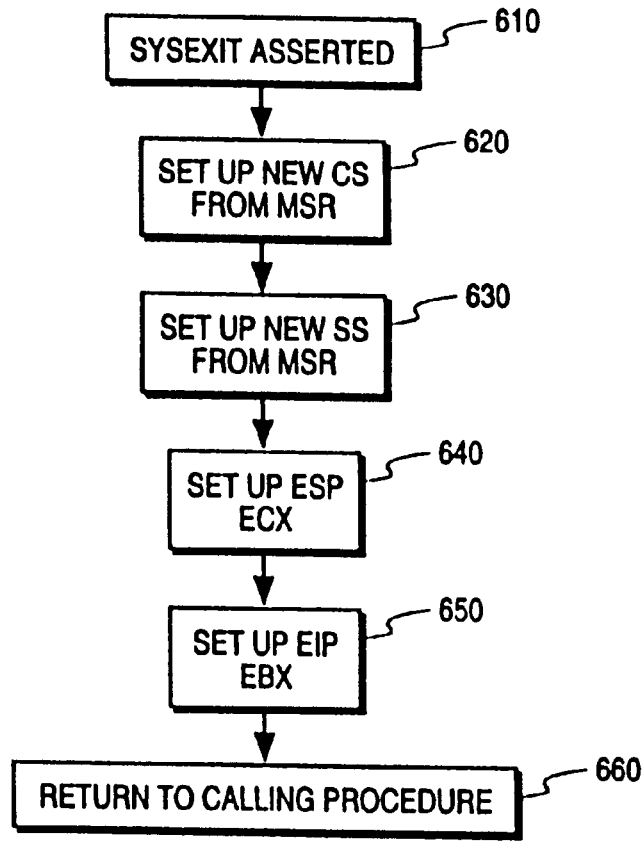
FIG. 6 illustrates a flow diagram of a SYSEXIT instruction in accordance with one embodiment of the present invention.

A block diagram of the SYSEXIT instruction is illustrated in FIG. 6. The SYSEXIT basically performs four restore functions. The values of the code segment and stack segment registers of the calling program are restored, as well as the instruction pointer and stack pointer registers.

The SYSEXIT instruction is asserted at step 610 from within the called procedure, which for one embodiment is an operating system kernel program.

Like any procedure return instruction, the SYSEXIT instruction restores execution to the calling program. This involves restoring the values of the code segment (CS), stack segment (SS), instruction pointer (EIP) and stack pointer (ESP) registers. As mentioned herein above, the SYSENTER instruction does not save the EIP or ESP values for the calling program. It is therefore necessary for these values to be saved by the calling program when a SYSENTER instruction is about to be executed.

At step 620 the code segment (CS) register value for the calling procedure (i.e. the system stub) is restored. For one embodiment, the CS value for the calling procedure is at a fixed location relative to SYSENTER_CS_MSR. Therefore, at step 620 this value is used to compute the restored CS register value. As an alternative embodiment, the CS value is copied from a memory location or register that was previously loaded with the appropriate value.

The stack segment (SS) register value for the calling procedure is restored at step 630. For one embodiment, this involves computing the new value based on the value located in SYSENTER_CS_MSR and storing that value in the SS register. For an alternative embodiment, the stack segment value is copied from a memory location or register that was previously loaded with the appropriate value.

Step 640 illustrates that the stack pointer (ESP) for the calling program is restored by copying the contents of the ECX register in to ESP. The instruction pointer (EIP) is restored at step 650 by copying the contents of the EBX register in to EIP. Thereafter, execution is transferred to the calling procedure and execution begins at the next instruction to which the restored EIP points, which may be the instruction following the SYSENTER instruction. Alternatively, as described herein above, it may be the instruction following the CALL instruction within the user code procedure. This is illustrated as step 660, the final step in the SYSEXIT routine.

The following is pseudo-code for one embodiment of the SYSEXIT instruction:

//three setup instructions
IF CR0.PE==0 THEN #GP0 //ensure segment protection enabled
IF CPL<>0 THEN #GP0 //privilege level must be 0
IF SYSENTER_CS_MSR<=3 THEN #GP0 //SYSEXIT not enabled
restore CS:EIP and SS:ESP and set the privilege level by setting DPL and RPL
CS.SEL:=SYSENTER_CS_MSR+16
cs.base:=0 //flat operating system
cs.limit:=4 G
cs.g:=1 //granularity=4k
cs.s:=1
cs.type_xCRA:=1011 //execute+read, accessed
cs.d:=1 //32 bit code
cs.dpl:=3 //calling program descriptor privilege level
cs.sel.rpl:=3 //calling program requester privilege level
SS.SEL:=SYSENTER_CS_MSR+24 //SS points to next selector up from CS
//set rest of SS to fixed value
ss.base:=0 //flat segment
ss.limit:=4 G
ss.g:=1 //granularity=4k
ss.s:=1
ss.type_xCRA:=0011 //read/write, accessed
ss.d:=1 //32 bit code
ss.dpl:=3 //calling program descriptor privilege level
ss.sel.rpl:=3 //calling program requester privilege level
ESP:=ECX
EIP:=EBX The embodiment of the SYSEXIT instruction shown in pseudo-code above may only return to a flat, protected mode calling procedure. However, for an alternate embodiment, the parameters used above in setting up the code and stack segments may be modified according to preference without departing from the scope of the present invention. Additionally, the embodiment of SYSEXIT shown above always returns to the lowest privilege level. Alternatively, the returning privilege level may be held within a register or memory location visible to the operating system and retrieved during the SYSEXIT routine. Moreover, an embodiment of the SYSEXIT instruction need not implement the setup instructions listed at the beginning of the pseudo-code.

Figure 7:
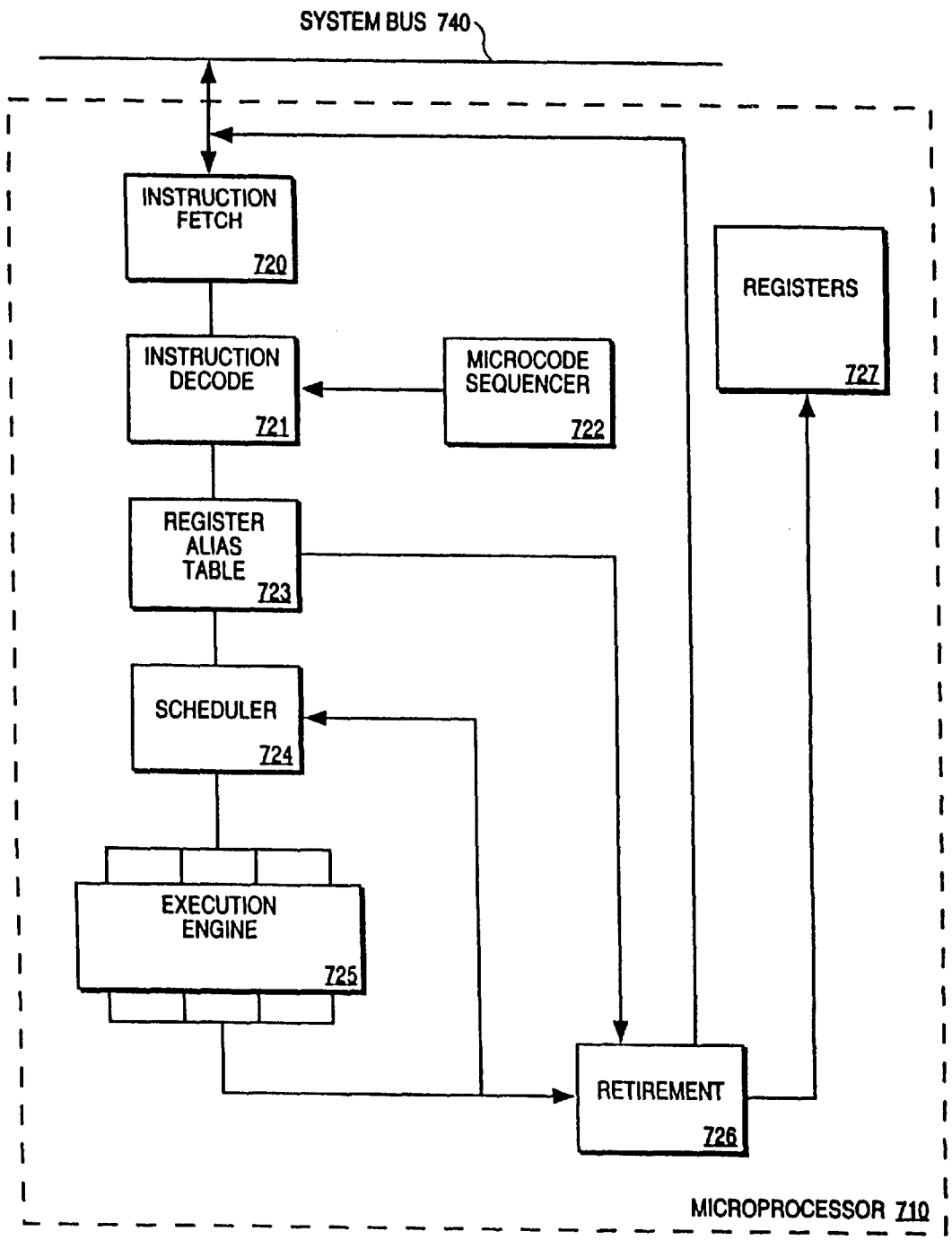
FIG. 7 illustrates a block diagram of a prior art microprocessor capable of executing the SYSENTER and SYSEXIT instructions in accordance with the present invention.

As was mentioned herein above, the SYSENTER and SYSEXIT instructions are computer instructions for execution on a microprocessor. FIG. 7 illustrates one embodiment of a microprocessor 710 capable of executing the SYSENTER and SYSEXIT instructions. The embodiment of microprocessor 710 illustrated in FIG. 7 is a speculative execution engine, wherein instructions may be executed out-of-order, without regard to the order of program flow.

The instruction fetch unit 720 of the microprocessor is responsible for retrieving blocks of data over the system bus 740. Within these blocks of data are instructions, e.g. SYSENTER and SYSEXIT instructions, to be executed by the microprocessor.

The instruction decode unit 721 identifies each instruction within the block of data. For one embodiment, the instruction decode unit 721 comprises one or more translate (XLAT) programmable logic arrays (PLAs) that decode each instruction in to one or more micro-operations. Micro-operations are primitive instructions that are executed by the microprocessor 710. The microcode sequencer 722 aids the instruction decoder 721 in decoding complex instructions that must be decoded in to several micro-operations.

For one embodiment of the invention, the SYSENTER and SYSEXIT instructions are decoded in to micro-operations that perform the steps illustrated in FIGS. 5 and 6, respectively.

The register alias table 723 includes an array of general purpose registers that are used in speculatively executing micro-operations. These registers are for storing a mapping of logical registers (e.g., EAX, EBX, ECX) to physical registers. The physical registers reside within the retirement block 726 and hold the speculative results of execution until the results may be committed to the logical registers within the register file 727.

The scheduler 724 includes an array for holding micro-operations until they are ready to be dispatched for execution. The micro-operation is determined to be ready when its source fields have been filled with appropriate data and when an execution unit is available. The micro-operation source fields contain data that is used as operands in executing the micro-operation. The scheduler 724 is responsible for finding that data, writing it into the field, and finally dispatching the micro-operation to the execution engine 725.

For one embodiment, the execution engine 725 comprises one or more execution engines, or execution units, that are each capable of executing a micro-operation. For one embodiment, the execution engine 725 comprises five execution units that are capable of executing in parallel. Each of the five execution units is especially designed to execute certain types of micro-operations. For instance, a floating-point execution unit is capable of executing floating-point micro-operations. A second execution unit may be responsible for retrieving information to from general registers or special registers, such as MSRs. A third execution unit may be responsible for loading general or special registers with appropriate values. Because the execution units are specialized, the scheduler 724 has the further job of determining the availability of appropriate execution units for each micro-operation waiting within the scheduler's queue.

Once each micro-operation has finished executing, the retirement unit 726 re-orders the micro-operations in the order of the original program flow. The retirement unit 726 then commits results of execution to the architectural state registers 727 and to memory locations on the system bus 740.

Recall that in one embodiment, the SYSENTER and SYSEXIT instructions use certain registers, such as machine status registers (MSRs) in transferring execution to a kernel procedure. Unlike the other general purpose registers, the MSRs are limited-access, in that only the most privileged code may write to these registers.

As was mentioned previously, the present invention need not be implemented on a speculative execution Intel Architecture computer system as shown in FIG. 7. For instance, the invention may include instructions that are executable on a reduced instruction set computer (RISC) architecture. Moreover, the invention may be implemented on a processor that is incapable of speculative execution, and therefore executes instructions in the program order.

As such, a method of performing a fast system call using two new instructions, SYSENTER and SYSEXIT, has been described. Using the SYSENTER and SYSEXIT instructions significantly reduces the amount of clock cycles required to perform a call to the operating system kernel. For instance, performing a system call with the SYSENTER and SYSEXIT instructions is on the order of approximately 4–10 times faster than using the prior art procedure call methods described herein. This fast system call is advantageous in that it increases the performance of software running on the computer system.

As was mentioned previously, computer programs, including library routines and operating systems, are often stored on some form of permanent storage device. For example, such a devices include read only memory (ROM), magnetic hard drives and optical compact discs (CD's). When the particular code is to be executed, it is loaded in another memory device, such as dynamic random access memory (DRAM).

The software procedures and instructions of the present invention are stored on such media. It can thus be contemplated that the scope of the invention includes a computer system with a memory device that contains a program to perform the functions described herein.

In the foregoing detailed description a method and apparatus for performing a fast system call is described. The fast system call of the present invention has been described with reference to specific exemplary embodiments thereof It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of performing a system call in a system having a user privilege level and a kernel privilege level, wherein the kernel privilege level is higher than the user privilege level, the method comprising:

executing a sequence of instructions at the user privilege level including a first instruction that requires a resource provided at the kernel privilege level;

transferring control to a first procedure executing at the user privilege level by performing a near call and saving only a pointer to the first instruction, the first procedure having a calling instruction that does not save an architectural state prior to transferring control;

transferring control from the first procedure to a second procedure executing at the kernel privilege level, the second procedure determining the resource required by the first instruction;

transferring control from the second procedure to a third procedure that is determined by the second procedure, the third procedure operating at the kernel privilege level and providing the resource required by the first instruction;

transferring control from the third procedure to a fourth procedure, the fourth procedure operating at the kernel privilege level and selectively restoring previously saved architectural state, the fourth procedure further returning control to the sequence of instructions.

2. The method of claim 1 wherein the second procedure performs a check to determine whether the first instruction is authorized to request the resource.

3. The method of claim 1, wherein transferring control from the first procedure to the second procedure further comprises:

storing a code segment value in a machine status register;

establishing a stack segment for the second procedure;

establishing a stack pointer for the second procedure;

establishing an instruction pointer for the second procedure;

moving from the user privilege level to the kernel privilege level; and executing the second procedure.

4. A machine-readable medium having stored thereon sequences of instruction that when executed cause a processor to perform a system call in a system having a user privilege level and a kernel privilege level, wherein the kernel privilege level is higher than the user privilege level, the sequences of instructions cause the processor to:

execute a sequence of instructions at the user privilege level including a first instruction that requires a resource provided at the kernel privilege level, transfer control to a first procedure executing at the user privilege level by performing a near call and saving only a pointer to the first instruction, the first procedure having a calling instruction that does not save an architectural state prior to transferring control;

transfer control from the first procedure to a second procedure executing at the kernel privilege level, the second procedure determining the resource required by the first instruction;

transfer control from the second procedure to a third procedure that is determined by the second procedure, the third procedure operating at the kernel privilege level and providing the resource required by the first instruction;

transfer control from the third procedure to a fourth procedure, the fourth procedure operating at the kernel privilege level and selectively restoring previously saved architectural state, the fourth procedure further returning control to the sequence of instructions.

5. The machine-readable medium of claim 4 wherein the second procedure performs a check to determine whether the first instruction is authorized to request the resource.

6. The machine-readable medium of claim 4, wherein the sequences of instructions that cause the processor to transfer control from the first procedure to the second procedure further comprise sequences of instructions that cause the processor to:

store a code segment value in a machine status register;

establish a stack segment for the second procedure;

establish a stack pointer for the second procedure;

establish an instruction pointer for the second procedure;

move from the user privilege level to the kernel privilege level; and execute the second procedure.

7. An apparatus for performing a system call in a system having a user privilege level and a kernel privilege level, wherein the kernel privilege level is higher than the user privilege level, the apparatus comprising:

means for executing a sequence of instructions at the user privilege level including a first instruction that requires a resource provided at the kernel privilege level;

means for transferring control to a first procedure executing at the user privilege level by performing a near call and saving only a pointer to the first instruction, the first procedure having a calling instruction that does not save an architectural state prior to transferring control;

means for transferring control from the first procedure to a second procedure executing at the kernel privilege level, the second procedure determining the resource required by the first instruction;

means for transferring control from the second procedure to a third procedure that is determined by the second procedure, the third procedure operating at the kernel privilege level and providing the resource required by the first instruction;

means for transferring control from the third procedure to a fourth procedure, the fourth procedure operating at the kernel privilege level and selectively restoring previously saved architectural state, the fourth procedure further returning control to the sequence of instructions.

8. The apparatus of claim 7 wherein the second procedure performs a check to determine whether the first instruction is authorized to request the resource.

9. The apparatus of claim 7, wherein transferring control from the first procedure to the second procedure further comprises:

means for storing a code segment value in a machine status register;

means for establishing a stack segment for the second procedure;

means for establishing a stack pointer for the second procedure;

means for establishing an instruction pointer for the second procedure;

means for moving from the user privilege level to the kernel privilege level; and means for executing the second procedure.

10. A method of performing a system call in a system having a user privilege level and a kernel privilege level, wherein the kernel privilege level is higher than the user privilege level, the method comprising:

executing a sequence of instructions at the user privilege level including a first instruction that requires a resource provided at the kernel privilege level;

transferring control to a first procedure executing at the user privilege level by performing a near call and saving only a pointer to the first instruction, the first procedure having a calling instruction that does not save an architectural state prior to transferring control;

transferring control from the first procedure to a second procedure executing at the kernel privilege level, the second procedure determining the resource required by the first instruction;

transferring control from the second procedure to a third procedure that is determined by the second procedure, the third procedure operating at the kernel privilege level and providing the resource required by the first instruction the third procedure further selectively restoring previously stored architectural state and returning control to the sequence of instructions.

11. The method of claim 10 wherein the second procedure performs a check to determine whether the first instruction is authorized to request the resource.

12. The method of claim 10, wherein transferring control from the first procedure to the second procedure further comprises:

storing a code segment value in a machine status register;

establishing a stack segment for the second procedure;

establishing a stack pointer for the second procedure;

establishing an instruction pointer for the second procedure;

moving from the user privilege level to the kernel privilege level; and executing the second procedure.

13. A machine-readable medium having stored thereon sequences of instructions that when executed by a processor to perform a system call in a system having a user privilege level and a kernel privilege level, wherein the kernel privilege level is higher than the user privilege level, the sequences of instructions cause the processor to:

execute a sequence of instructions at the user privilege level including a first instruction that requires a resource provided at the kernel privilege level;

transfer control to a first procedure executing at the user privilege level by performing a near call and saving only a pointer to the first instruction, the first procedure having a calling instruction that does not save an architectural state prior to transferring control;

transfer control from the first procedure to a second procedure executing at the kernel privilege level, the second procedure determining the resource required by the first instruction;

transfer control from the second procedure to a third procedure that is determined by the second procedure, the third procedure operating at the kernel privilege level and providing the resource required by the first instruction the third procedure further selectively restoring previously saved architectural state and returning control to the sequence of instructions.

14. The machine-readable medium of claim 13 wherein the second procedure performs a check to determine whether the first instruction is authorized to request the resource.

15. The machine-readable of claim 13, wherein the sequences of instructions that cause the processor to transfer control from the first procedure to the second procedure further comprise sequences of instructions that, when executed, cause the processor to:

store a code segment value in a machine status register;

establish a stack segment for the second procedure;

establish a stack pointer for the second procedure;

establish an instruction pointer for the second procedure;

move from the user privilege level to the kernel privilege level; and execute the second procedure.

16. An apparatus for performing a system call in a system having a user privilege level and a kernel privilege level, wherein the kernel privilege level is higher than the user privilege level, the apparatus comprising:

means for executing a sequence of instructions at the user privilege level including a first instruction that requires a resource provided at the kernel privilege level;

means for transferring control to a first procedure executing at the user privilege level by performing a near call and saving only a pointer to the first instruction, the first procedure having a calling instruction that does not save an architectural state prior to transferring control;

means for transferring control from the first procedure to a second procedure executing at the kernel privilege level, the second procedure determining the resource required by the first instruction;

means for transferring control from the second procedure to a third procedure that is determined by the second procedure, the third procedure operating at the kernel privilege level and providing the resource required by the first instruction the third procedure further selectively restoring previously saved architectural state and returning control to the sequence of instructions.

17. The apparatus of claim 16 wherein the second procedure performs a check to determine whether the first instruction is authorized to request the resource.

18. The apparatus of claim 16, wherein the means for transferring control from the first procedure to the second procedure further comprises:

means for storing a code segment value in a machine status register;

means for establishing a stack segment for the second procedure;

means for establishing a stack pointer for the second procedure;

means for establishing an instruction pointer for the second procedure;

means for moving from the user privilege level to the kernel privilege level; and means for executing the second procedure.

19. A system comprising:

a bus;

a memory coupled to the bus, the memory to store instructions; and a processor coupled to the bus, the processor to execute at least a portion of the instructions stored in the memory;

wherein the processor executes a first instruction at the user privilege level that requires a resource provided at the kernel privilege level, transfers control to a first procedure executing at the user privilege level by performing a near call and saving only a pointer to the first instruction, the first procedure having a calling instruction that does not save an architectural state prior to transferring control, transfers control from the first procedure to a second procedure executing at the kernel privilege level, the second procedure determining the resource required by the first instruction, transfers control from the second procedure to a third procedure that is determined by the second procedure, the third procedure operating at the kernel privilege level and providing the resource required by the first instruction the third procedure further selectively restoring previously saved architectural state and returning control to the sequence of instructions.

20. A system comprising:

a bus;

a memory coupled to the bus, the memory to store instructions; and a processor coupled to the bus, the processor to execute at least a portion of the instructions stored in the memory;

wherein the processor executes a first instruction at the user privilege level that requires a resource provided at the kernel privilege level, transfers control to a first procedure executing at the user privilege level by performing a near call and saving only a pointer to the first instruction, the first procedure having a calling instruction that does not save an architectural state prior to transferring control, transfers control from the first procedure to a second procedure executing at the kernel privilege level, the second procedure determining the resource required by the first instruction, transfers control from the second procedure to a third procedure that is determined by the second procedure, the third procedure operating at the kernel privilege level and providing the resource required by the first instruction, and transfers control from the third procedure to a fourth procedure, the fourth procedure operating at the kernel privilege level and selectively restoring previously saved architectural state, the fourth procedure further returning control to the sequence of instructions.

* * * * *

UNITED STATES PATENT AND TRADEMARK OFFICE
CERTIFICATE OF CORRECTION

PATENT NO. : 5,948,097  Page 1 of 1
DATED : September 7, 1999
INVENTOR(S) : Glew et al.

It is certified that error appears in the above-identified patent and that said Letters Patent is hereby corrected as shown below:

Column 1,
Line 31, delete "(CM)" and insert -- (MCM) --.

Column 2,
Line 45, delete "Pentium" and insert -- Pentium® --.

Column 8,
Line 5, delete second occurrence of "SS" and insert -- / /SS --.

Column 9,
Line 35, delete "restore" and insert -- / /restore --.

Signed and Sealed this

Twenty-fifth Day of March, 2003

JAMES E. ROGAN
*Director of the United States Patent and Trademark Office*